(12) United States Patent
Chen et al.

(10) Patent No.: US 8,545,745 B2
(45) Date of Patent: Oct. 1, 2013

(54) METHOD FOR USING A POISSON RATIO MATERIAL

(71) Applicants: Lu-Zhuo Chen, Beijing (CN); Chang-Hong Liu, Beijing (CN); Jia-Ping Wang, Beijing (CN); Shou-Shan Fan, Beijing (CN)

(72) Inventors: Lu-Zhuo Chen, Beijing (CN); Chang-Hong Liu, Beijing (CN); Jia-Ping Wang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/632,412

(22) Filed: Oct. 1, 2012

(65) Prior Publication Data

US 2013/0026679 A1 Jan. 31, 2013

Related U.S. Application Data

(63) Continuation of application No. 12/589,460, filed on Oct. 22, 2009, now abandoned.

(30) Foreign Application Priority Data

Apr. 27, 2009 (CN) .......................... 2009 1 0106937

(51) Int. Cl.
*B29C 55/00* (2006.01)
(52) U.S. Cl.
USPC ................ 264/291; 264/288.4; 264/DIG. 73; 977/742
(58) Field of Classification Search
None
See application file for complete search history.

(56) References Cited

U.S. PATENT DOCUMENTS

| | | | | |
|---|---|---|---|---|
| 6,957,993 | B2 * | 10/2005 | Jiang et al. | 445/50 |
| 7,744,793 | B2 * | 6/2010 | Lemaire et al. | 264/172.19 |
| 2003/0122111 | A1 * | 7/2003 | Glatkowski | 252/500 |
| 2005/0242344 | A1 * | 11/2005 | Lee et al. | 257/40 |
| 2008/0095694 | A1 | 4/2008 | Nakayama et al. | |
| 2008/0145570 | A1 | 6/2008 | Zhang et al. | |
| 2008/0223795 | A1 | 9/2008 | Bakajin et al. | |
| 2009/0153503 | A1 | 6/2009 | Jiang et al. | |
| 2010/0123267 | A1 * | 5/2010 | Jiang et al. | 264/291 |
| 2010/0227155 | A1 * | 9/2010 | Bao et al. | 428/323 |
| 2012/0070625 | A1 * | 3/2012 | Liu et al. | 428/174 |

FOREIGN PATENT DOCUMENTS

| | | |
|---|---|---|
| EP | 2043406 | 4/2009 |
| JP | 2002-518280 | 6/2002 |
| JP | 2005255985 | 9/2005 |
| JP | 2008-45124 | 2/2008 |
| JP | 2009-505825 | 2/2009 |
| JP | 2009146411 | 7/2009 |
| WO | WO9965821 | 12/1999 |
| WO | WO2005102924 | 11/2005 |
| WO | WO 2007015710 A2 * | 2/2007 |

* cited by examiner

*Primary Examiner* — Benjamin Schiffman
(74) *Attorney, Agent, or Firm* — Altis & Wispro Law Group, Inc.

(57) ABSTRACT

A method for using a Poisson's ratio material includes a carbon nanotube film structure is provided. The carbon nanotube film structure includes a plurality of carbon nanotubes. A first part of the carbon nanotubes are aligned a first direction, a second part of the carbon nanotubes are aligned a second direction. The first direction is substantially perpendicular to second direction. When the Poisson's ratio material is stretched or compressed substantially along the first or second direction, a Poisson's ratio value is negative. When the Poisson's ratio material is stretched or compressed in a direction having an angle of about 45 degrees with the first direction, the Poisson's ratio value is positive.

9 Claims, 8 Drawing Sheets

METHOD FOR USING A POISSON RATIO MATERIAL

CROSS-REFERENCE TO RELATED APPLICATIONS

This application is a continuation of U.S. patent application Ser. No. 12/589,460 filed on Oct. 22, 2009 entitled, "POSITIVE AND NEGATIVE POISSON'S RATIO MATERIAL". The disclosures of the above-identified applications are incorporated herein by reference.

BACKGROUND

1. Technical Field

The present disclosure relates to a method for using carbon nanotube material and, in particular, to a method for using carbon nanotube material having a positive and negative Poisson's ratio.

2. Discussion of the Related Art

When a sample of material is stretched in one direction, it tends to contract (or occasionally, expand) perpendicular to the direction of stretch. Conversely, when a sample of material is compressed in one direction, it tends to expand (or rarely, contract) perpendicular to the direction of compression. This phenomenon is called the Poisson effect. Poisson's ratio v is a measure of the Poisson effect.

Assuming that the material is stretched along the axial direction:

$$v = -\frac{\varepsilon_{trans}}{\varepsilon_{axial}},$$

wherein v is the resulting Poisson's ratio, $\varepsilon_{trans}$ is transverse strain (negative for axial tension, positive for axial compression), $\varepsilon_{axial}$ is axial strain (positive for axial tension, negative for axial compression).

The Poisson's ratio of a stable, isotropic, linear elastic material cannot be less than −1.0 nor greater than 0.5 due to the requirement that the elastic modulus, the shear modulus and bulk modulus have positive values. Most materials have positive Poisson's ratio values ranging between 0.0 and 0.5. A perfectly incompressible material deformed elastically at small strains would have a Poisson's ratio of exactly 0.5. Most steels and rigid polymers when used within their design limits (before yield) exhibit values of about 0.3, and increasing to 0.5 for post-yield deformation (which occurs largely at constant volume). Rubber has a Poisson's ratio of nearly 0.5.

The Poisson's ratio of cork is close to 0, showing very little lateral expansion when compressed. Some materials, mostly polymer foams, have a negative Poisson's ratio, if these auxetic materials are stretched in one direction, they become thicker in perpendicular directions.

What is needed is a method for using a Poisson's ratio carbon nanotube material having both negative and positive Poisson's ratios.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

DETAILED DESCRIPTION

Figure 1:
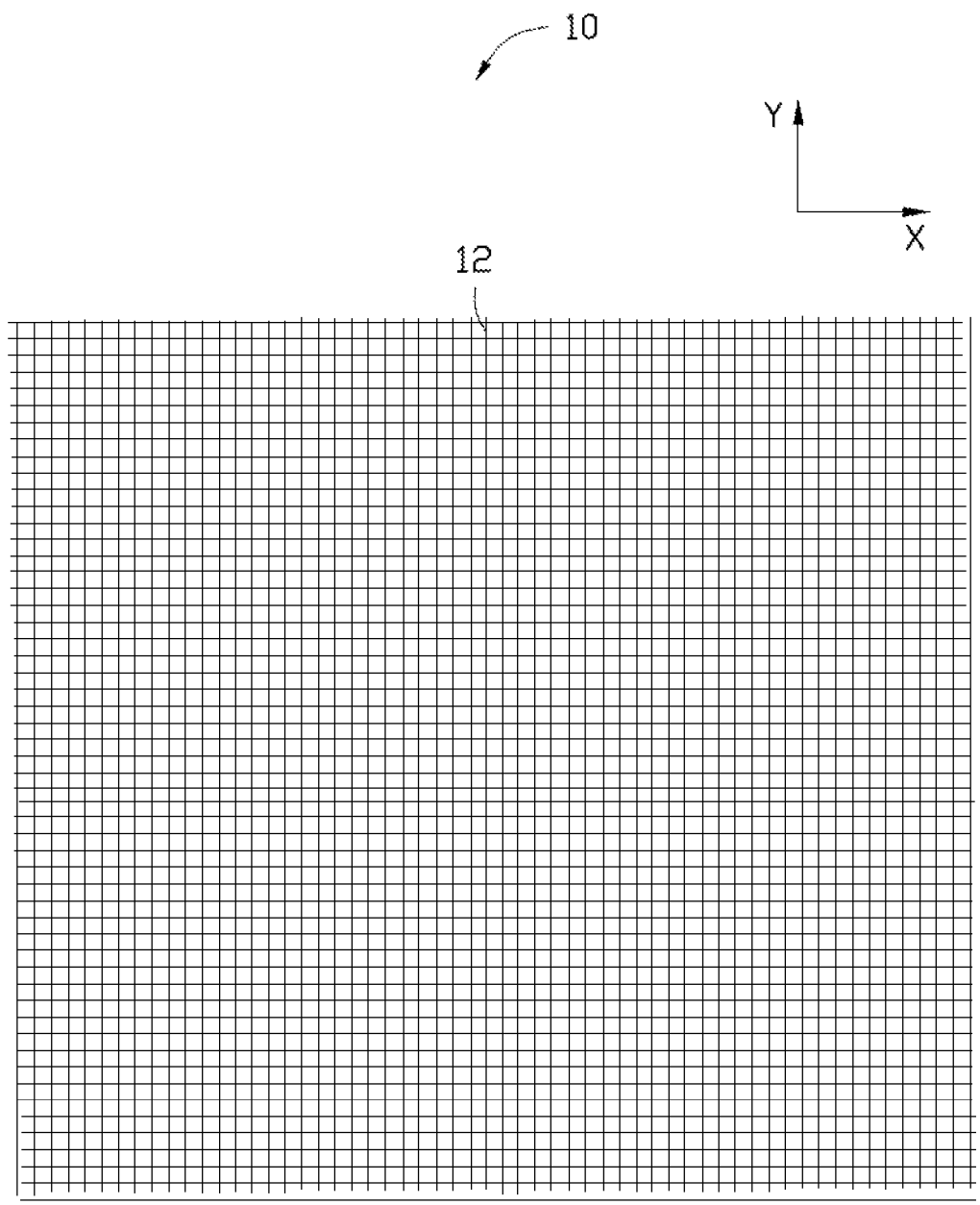
FIG. 1 is a schematic top plan view of one embodiment of a material having a positive and negative Poisson's ratio.

Referring to FIG. 1, one embodiment of a material 10 having a negative and positive Poisson's ratio includes a carbon nanotube film structure 12. The carbon nanotube film structure 12 includes a plurality of carbon nanotubes assembled together by Van der Waals attractive forces. The orientation of the carbon nanotubes is biaxial which means the carbon nanotubes can be divided into two parts according to their orientation. A first part of the carbon nanotubes is aligned along a first direction X or namely a first characteristic direction, and a second part of the carbon nanotubes is aligned along a second direction Y or namely a second characteristic direction. The first direction X can be substantially perpendicular to the second direction Y, as shown in FIG. 1. The first part of the carbon nanotubes crosses with the second part of the carbon nanotubes to form a plurality of grids.

The above-described carbon nanotubes form at least two stacked carbon nanotube films. The carbon nanotubes in each of the carbon nanotube films are successively oriented and joined end to end by Van der Waals attractive force. The carbon nanotube films of the carbon nanotube film structure 12 can be sorted into two sorts by the orientation of the carbon nanotubes. In one sort, the orientation of the carbon nanotubes is along the first direction X. In another sort, the orientation of the carbon nanotubes is along the second direction Y. A thickness of each of the carbon nanotube films is in a range from about 0.5 nanometers to about 1 micron.

The orientations of the carbon nanotubes in every two adjacent carbon nanotube films are substantially perpendicular to each other. The carbon nanotube films are integrated with each other by Van der Waals attractive force to form the carbon nanotube film structure 12. The carbon nanotube film structure 12 is a free-standing structure. Free standing means that the carbon nanotubes combine, connect or join with each other by Van der Waals attractive force, to form the carbon nanotube film structure 12. The carbon nanotube film structure 12 can be supported by itself and does not need a substrate for support. It should be noted that the carbon nanotube film structure 12 may be positioned on a substrate in actual application if additional strength for a particular application of the carbon nanotube film structure 12. The number of the layers of the carbon nanotube films in the material 10 is not limited. In one embodiment, the number of the layers of the carbon nanotube films in the material 10 can be in a range from 10 to 5000. The thickness of the carbon nanotube film structure 12 is in a range from about 0.04 micron to about 400 microns.

Figure 2:
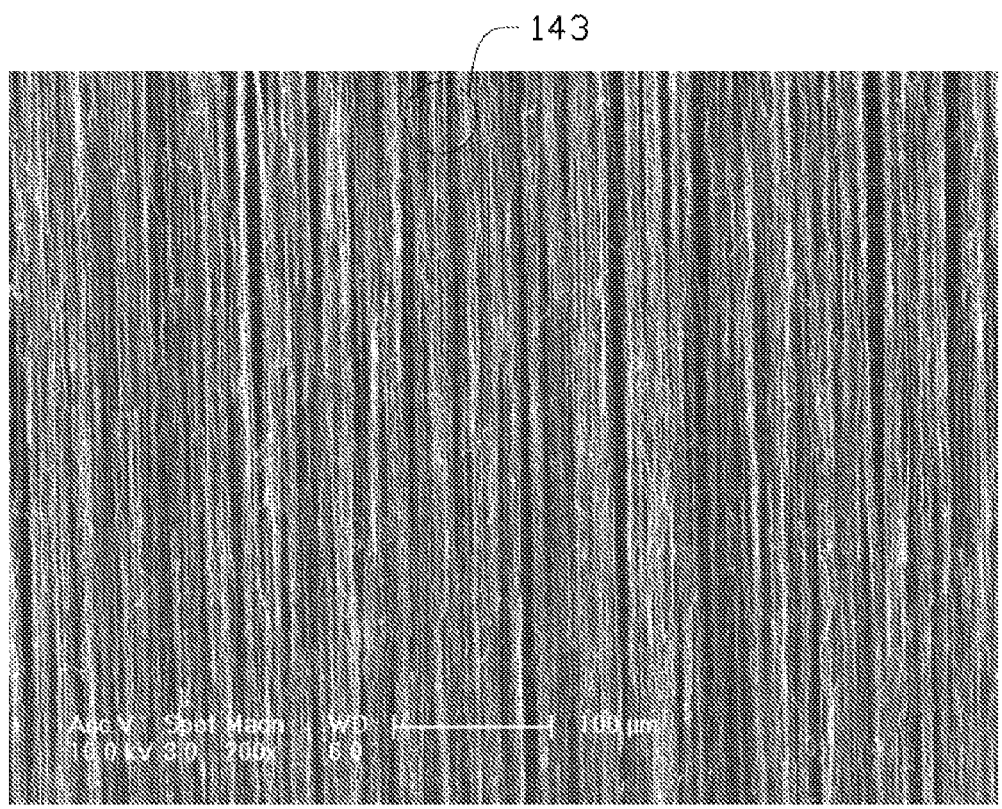
FIG. 2 is a Scanning Electron Microscope (SEM) image of a carbon nanotube film of the material in FIG. 1.
Figure 3:
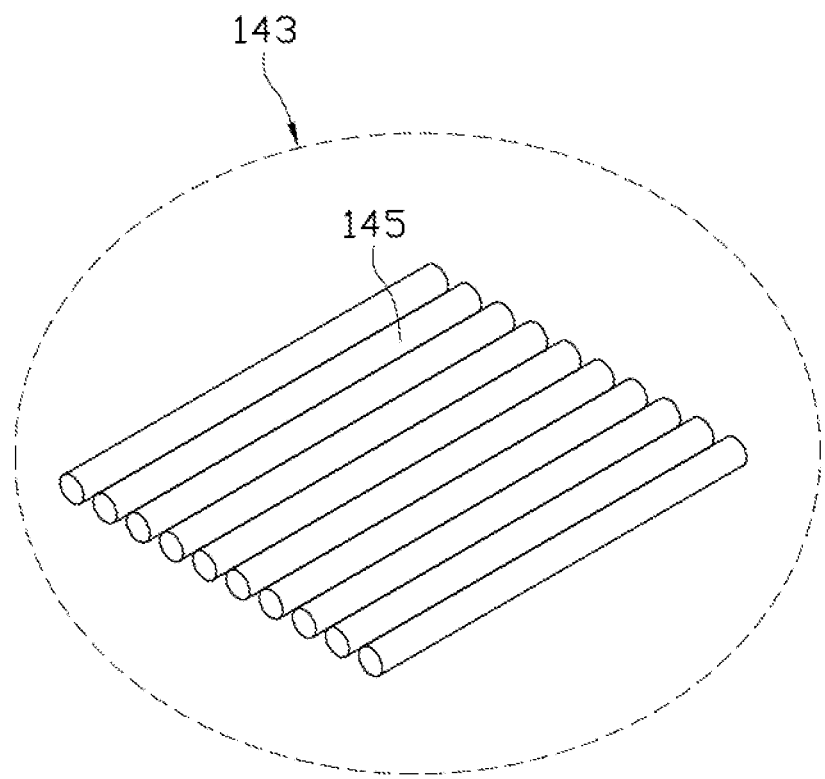
FIG. 3 is an enlarged view of a carbon nanotube segment in FIG. 2.

Referring to FIG. 2 and FIG. 3, the carbon nanotube film includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and combined by Van der Waals attractive force therebetween. The carbon nanotube segments 143 can vary in width, thickness, uniformity, and shape. The carbon nanotubes 145 in the carbon nanotube film are also oriented substantially along a preferred orientation.

Figure 4:
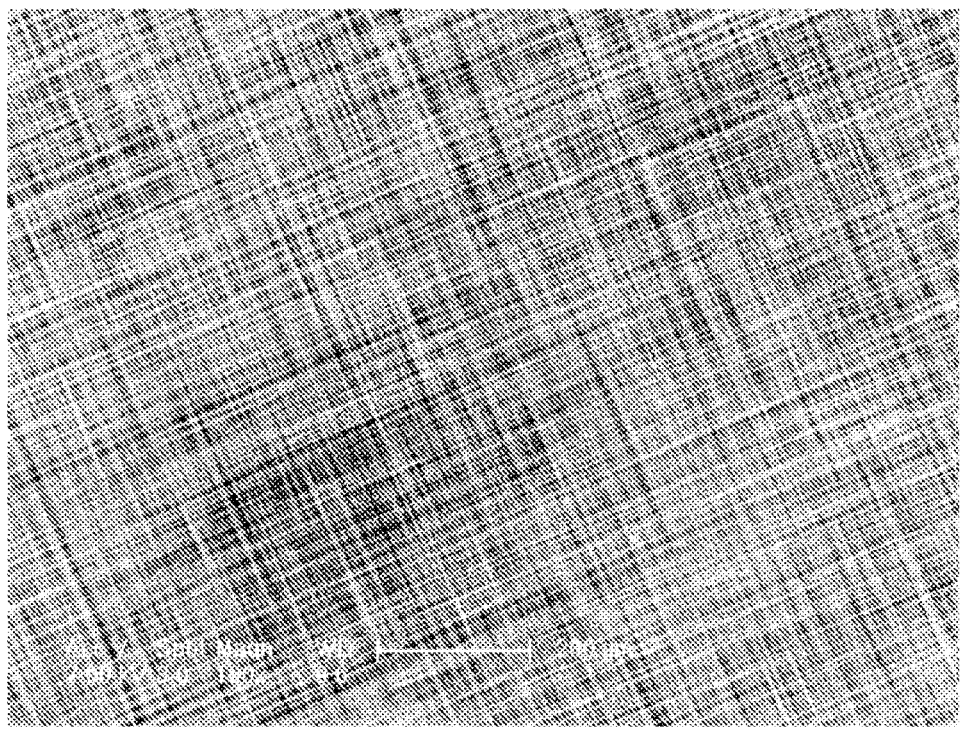
FIG. 4 is an SEM image of a carbon nanotube film structure of the material in FIG. 1 showing the carbon nanotubes in one carbon nanotube film are oriented substantially perpendicular to carbon nanotubes in an adjacent carbon nanotube film.

Referring to FIG. 4, the carbon nanotube films of the carbon nanotube structure 12 are stacked. The carbon nanotubes in the carbon nanotube structure 12 are substantially aligned along the first direction X or the second direction Y. In another embodiment, the carbon nanotube structure 12 comprises about 100 layers of carbon nanotube films. The carbon nanotube structure 12 comprises a plurality of grids.

The material 10 has both negative Poisson's ratio and positive Poisson's ratio as described in the following.

When the material 10 is stretched in one oriented direction of the carbon nanotubes in the carbon nanotube structure 12, i.e. one of the first direction X and the second direction Y, it tends to expand in the other oriented direction of the carbon nanotubes in the carbon nanotube structure 12, i.e. the other one of the second direction Y and the first direction X. The direction of expansion is substantially perpendicular to the direction of stretching. Conversely, when the material 10 is compressed in one of the first direction X and the second direction Y, it tends to contract in the other one of the second direction Y and the first direction X. The direction of contraction is substantially perpendicular to the direction of compression. Thus, the material 10 has a negative Poisson's ratio when it is stretched or compressed in one of the first direction X and the second direction Y. For example, the Poisson's ratio of the material 10 can be about −0.50.

When the material 10 is stretched in a third direction, or namely a third characteristic direction, which has an angle of about 45 degrees to the first direction X and the second direction Y, it tends to contract in another direction substantially perpendicular to the direction of stretching. Conversely, when the material 10 is compressed in the third direction, it tends to expand in the other direction substantially perpendicular to the direction of compression. Therefore, the material 10 has a positive Poisson's ratio when it is stretched or compressed in the third direction.

Figure 5:
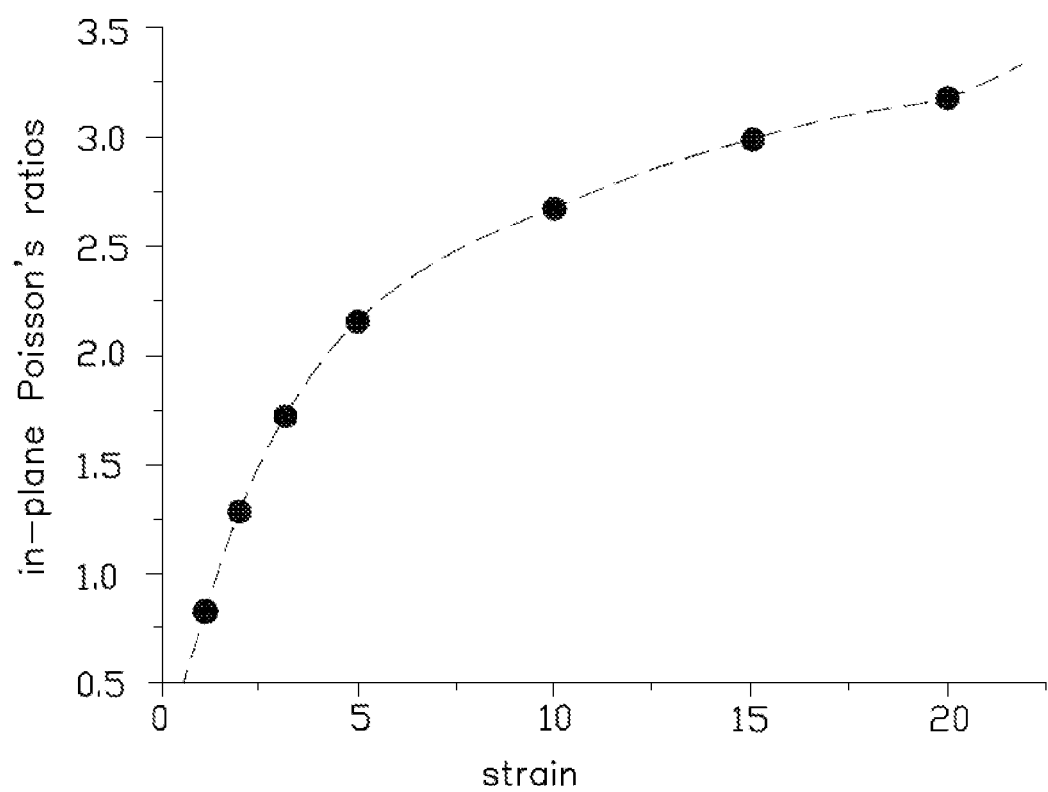
FIG. 5 shows the changes of in-plane Poisson's ratios of the material in FIG. 1 with increasing strain.

Referring to FIG. 5, it shows the changes of in-plane Poisson's ratios of the material 10 with increasing strain. When the strain of the Poisson's ratio in the third direction is 5%, the Poisson's ratio is 2.25. When the strain of the Poisson's ratio in the third direction is 20%, the Poisson's ratio is 3.25.

In one embodiment, the carbon nanotube film structure 12 can be manufactured by the following steps:

(a) providing a super-aligned carbon nanotube array;

(b) selecting one or more carbon nanotubes having a predetermined width from the super-aligned carbon nanotube array;

(c) pulling out the carbon nanotubes from the super-aligned carbon nanotube array to form carbon nanotube segments that are joined end to end at a uniform speed to achieve a uniform carbon nanotube film; and (d) providing a frame and stacking at least two carbon nanotube films on the frame to form the above described carbon nanotube film structure 12.

In step (a), the super-aligned carbon nanotube array can be formed by:

(a1) providing a substantially flat and smooth substrate;

(a2) forming a catalyst layer on the substrate;

(a3) annealing the substrate with the catalyst layer in air at a temperature from about 700° C. to about 900° C. for about 30 to about 90 minutes;

(a4) heating the substrate with the catalyst layer to a temperature from about 500° C. to about 740° C. in a furnace with a protective gas therein; and (a5) supplying a carbon source gas to the furnace for about 5 to about 30 minutes and growing the super-aligned carbon nanotube array on the substrate.

In step (a1), the substrate can be a P-type silicon wafer, an N-type silicon wafer, or a silicon wafer with a film of silicon dioxide thereon. Here, a 4-inch P-type silicon wafer is used as the substrate.

In step (a2), the catalyst can be iron (Fe), cobalt (Co), nickel (Ni), or any alloy thereof.

In step (a4), the protective gas can be at least one of the following: nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned carbon nanotube array can be about 200 microns to about 400 microns in height, and includes a plurality of substantially parallel carbon nanotubes approximately perpendicular to the substrate. The carbon nanotubes in the super-aligned carbon nanotube array can be single-walled carbon nanotubes, double-walled carbon nanotubes, or multi-walled carbon nanotubes. Diameters of the single-walled carbon nanotubes can be from about 0.5 nanometers to about 10 nanometers, diameters of the double-walled carbon nanotubes can be from about 1 nanometer to about 50 nanometers, and diameters of the multi-walled carbon nanotubes can be from 1.5 nanometers to 50 nanometers.

The super-aligned carbon nanotube array formed under such conditions are essentially free of impurities such as carbonaceous or residual catalyst particles. The carbon nanotubes in the super-aligned array are closely packed together by Van der Waals attractive force.

In step (b), the carbon nanotubes having a predetermined width can be selected by using an adhesive tape as the tool to contact the super-aligned carbon nanotube array. Each carbon nanotube segment includes a plurality of substantially parallel carbon nanotubes. In step (c), the pulling direction is substantially perpendicular to the growing direction of the super-aligned carbon nanotube array.

Specifically, during the pulling process, as the initial carbon nanotube segment is drawn out, other carbon nanotube segments are also drawn out end-to-end due to the Van der Waals attractive force between ends of adjacent segments. This process of drawing ensures that a continuous, uniform carbon nanotube film having a certain width can be formed. The carbon nanotube film includes a plurality of carbon nanotubes joined end-to-end. The carbon nanotubes in the carbon nanotube film are all substantially parallel to the pulling/drawing direction, and the carbon nanotube film produced in such manner can be selectively formed to have a predetermined width. The carbon nanotube film formed by the pulling/drawing method has superior uniformity of thickness and conductivity over a typical carbon nanotube film in which the carbon nanotubes are disorganized and not arranged along any particular axis. Furthermore, the pulling/drawing method is simple and quick, thereby making it suitable for industrial applications.

The maximum width possible for the carbon nanotube film depends on the size of the carbon nanotube array. The length of the carbon nanotube film can be arbitrarily set as desired. If the substrate is a 4-inch P-type silicon wafer, the width of the carbon nanotube film can be from about 0.01 centimeters to about 10 centimeters, and the thickness of the carbon nanotube film is from about 0.5 nanometers to about 100 microns.

In step (d), it is noted that because the carbon nanotubes in the super-aligned carbon nanotube array have a high purity and a high specific surface area, the carbon nanotube film is adherent in nature. As a result, at least one carbon nanotube film can be directly adhered to the frame, thus forming one carbon nanotube film structure 12 on the frame, thereby creating one carbon nanotube film structure 12.

For example, two or more such carbon nanotube films can be stacked on each other on the frame to form a carbon nanotube film structure 12 with stacked carbon nanotube films. The angle between the alignment axes of the carbon nanotubes in each two adjacent carbon nanotube films is about 90 degrees. The carbon nanotubes in each two adjacent carbon nanotube films are crossing each other, thereby providing the carbon nanotube film structure 12 with a microporous structure.

It is to be understood that in alternative embodiments, the carbon nanotube film structure 12 can be treated with an organic solvent. In these situations, each carbon nanotube film or the carbon nanotube film structure 12 can be adhered on the frame and soaked in an organic solvent bath. After being soaked in the organic solvent, the carbon nanotube segments in the nanotube film of the carbon nanotube film structure 12 can, at least partially, shrink and firmly bundle into carbon nanotube bundles.

Figure 6:
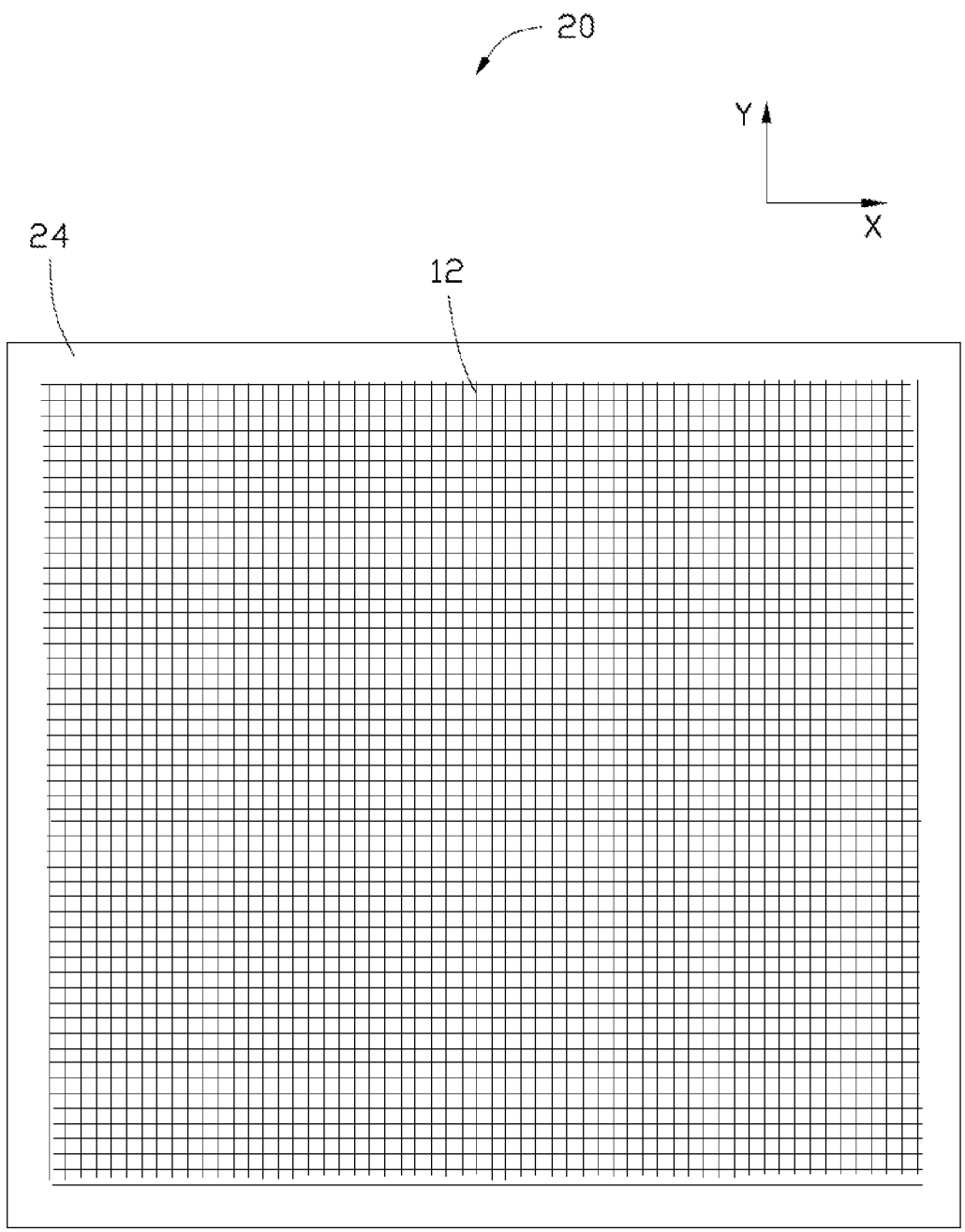
FIG. 6 is a schematic top plan view of another embodiment of a material having a positive and negative Poisson's ratio.
Figure 7:
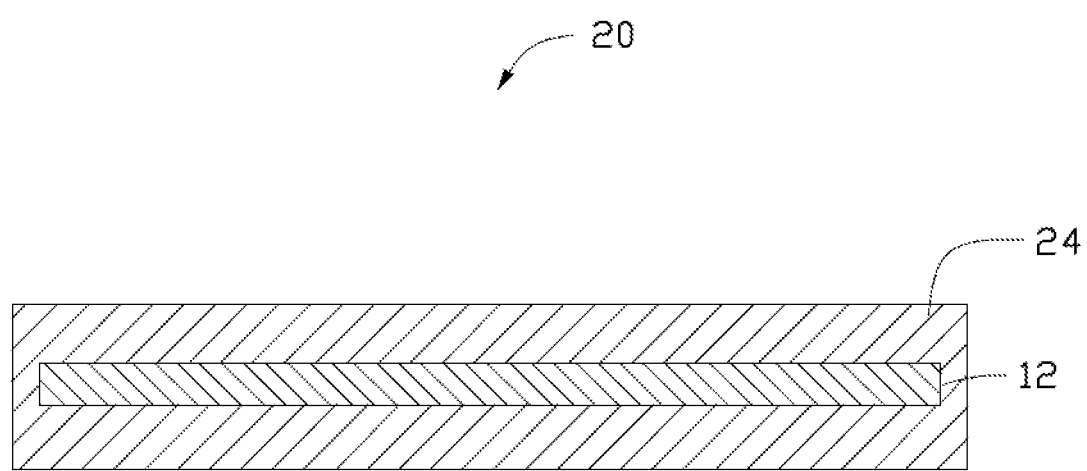
FIG. 7 is a cross-sectional view of the material in FIG. 6.

Referring to FIG. 6 and FIG. 7, another embodiment of a material 20 includes a carbon nanotube film structure 12 and a polymer matrix 24 which may be made of a flexible polymer material. The carbon nanotube film structure 12 is disposed in the flexible polymer matrix 24.

The carbon nanotube film structure 12 has a same structure as that of the carbon nanotube film structure 12 in the previous embodiment.

The flexible polymer of the polymer matrix can be polydimethylsiloxane, polyurethane, epoxy resin, or polymethylmethacrylate (PMMA). In this embodiment, the flexible polymer is polydimethylsiloxane (PDMS), which is transparent and flexible and has a very large strain-to-failure (>150%). Thus, the Poisson's ratio material 20 has a large strain-to-failure of about 22%. In one embodiment, the flexible polymer matrix is a flexible polymer layer with a thickness in a range from about 100 μm to about 1000 μm.

In one embodiment, the carbon nanotube film structure 12 is locally distributed in the flexible polymer matrix 14 due to its limited thickness (about 40 microns) compared to the thickness of the flexible polymer matrix 24 (about 200 microns), which causes a sandwich layer structure in the composite. In the CNT/PDMS composite region, the carbon nanotubes are evenly dispersed in the PDMS matrix.

The Poisson's ratio material 20 has both negative Poisson's ratio and positive Poisson's ratio. When the Poisson's ratio material 20 is stretched in one oriented direction of the carbon nanotubes in the carbon nanotube structure 12 (the first direction X or the second direction Y), it tends to expand in the other oriented direction of the carbon nanotubes in the carbon nanotube structure 12 (the second direction Y or the first direction X). The direction of expansion is substantially perpendicular to the direction of stretching. Conversely, when the Poisson's ratio material 20 is compressed in one oriented direction of the carbon nanotubes in the carbon nanotube structure 12 (the first direction X or the second direction Y), it tends to contract in the other oriented directions of the carbon nanotubes in the carbon nanotube structure 12 (the second direction Y or the first direction X). The direction of contraction is substantially perpendicular to the direction of compression. Thus, the Poisson's ratio material 20 has a negative Poisson's ratio.

When the Poisson's ratio material 20 is stretched in a direction having an angle of about 45 degrees relative to the oriented direction of the carbon nanotubes in the carbon nanotube structure 12 (the first direction X or the second direction Y), it tends to contract in another direction substantially perpendicular to the direction of stretching. Conversely, when the Poisson's ratio material 20 is compressed in a direction having a angle of about 45 degrees with the oriented direction of the carbon nanotubes in the carbon nanotube structure 12 (the first direction X or the second direction Y), it tends to expand in the other direction substantially perpendicular to the direction of compression.

Figure 8:
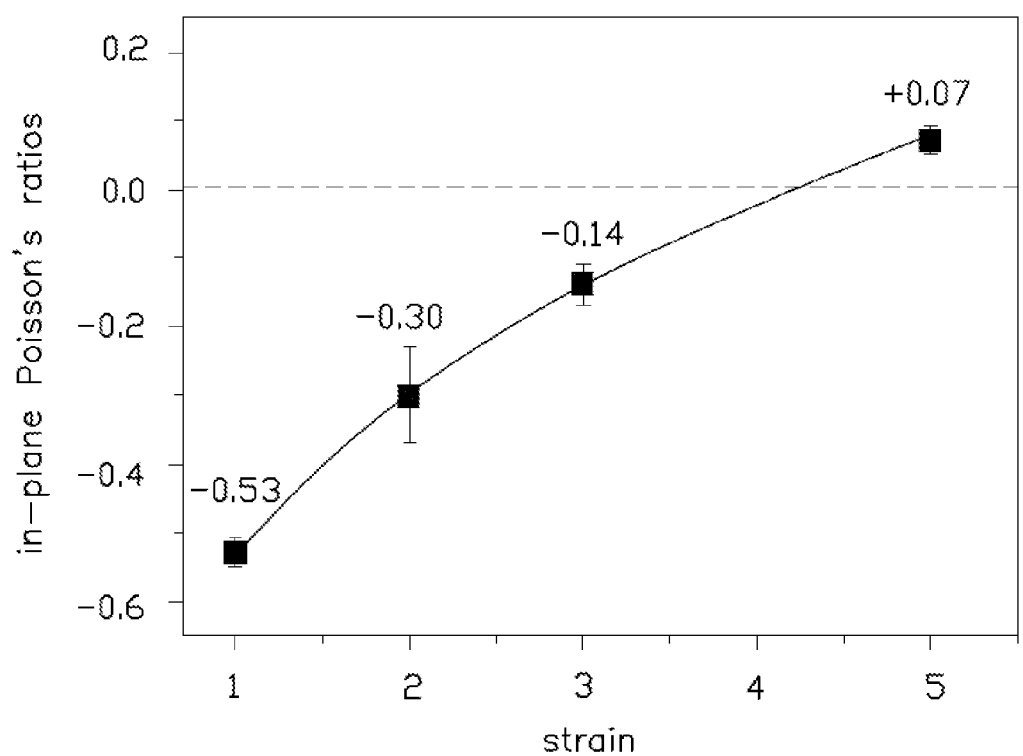
FIG. 8 shows the changes of in-plane Poisson's ratios of the material in FIG. 6 with increasing strain.

Referring to FIG. 8, it shows the changes of in-plane Poisson's ratios of the Poisson's ratio materials 20 with increasing strain. When the strain along the first direction X or the second direction Y is about 1%, the Poisson's ratio of the Poisson's ratio material 20 is about −0.53. When the strain along the first direction X or the second direction Y is about 2%, the Poisson's ratio of the Poisson's ratio material 20 is about −0.30. With increased strain, the Poisson's ratio of the Poisson's ratio material 20 can be a positive value. For example, when the strain along the first direction X or the second direction Y is about 5%, the Poisson's ratio of the Poisson's ratio material 20 is about +0.07.

The Poisson's ratio material 20 has many advantages, including a large strain-to-failure and flexibility. It will be more applicable for practical applications where large strains are needed. When the carbon nanotube film structure 12 is directly exposed to an external environment, it is fragile and sticks easily to other things because of the Van der Waals attractive force. When the carbon nanotube film structure 12 is embedded in PDMS, it will not be exposed to the external environment directly and the negative Poisson's ratios can be maintained in the material 20. PDMS provides a protective function here.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method for using a Poisson's ratio material, comprising:
   providing the Poisson's ratio material, wherein the Poisson's ratio material comprises:
      a flexible polymer matrix; and
      a carbon nanotube film structure disposed in the flexible polymer matrix, the carbon nanotube film structure comprising a plurality of carbon nanotubes, wherein a first part of the carbon nanotubes is aligned along a first direction, a second part of the carbon nanotubes is aligned along a second direction, and the first direction is substantially perpendicular to the second direction; and
   stretching or compressing the poisson's ratio material in a direction having an angle of about 45 degrees relative to the first direction.

2. The method for using a Poisson's ratio material as claimed in claim 1, wherein the first part of the carbon nanotubes is stacked on the second part of the carbon nanotubes in a substantially perpendicular manner.

3. The method for using a Poisson's ratio material as claimed in claim 2, wherein the first part of the carbon nanotubes and the second part of the carbon nanotubes are combined to each other by Van der Waals attractive force, to form the carbon nanotube film structure.

4. The method for using a Poisson's ratio material as claimed in claim 1, wherein an orientation of the plurality of carbon nanotubes of the carbon nanotube film structure is biaxial.

5. The method for using a Poisson's ratio material as claimed in claim 1, wherein the carbon nanotube film structure comprises at least two stacked carbon nanotube films, the first part of the carbon nanotubes forms one of the at least two stacked carbon nanotube films, and the second part of the carbon nanotubes forms the other one of the at least two stacked carbon nanotube films.

6. The method for using a Poisson's ratio material as claimed in claim 5, wherein each carbon nanotube film comprises a plurality of successive and oriented carbon nanotubes joined end to end by Van der Waals attractive force.

7. The method for using a Poisson's ratio material as claimed in claim 1, wherein the Poisson's ratio material shows a positive Poisson's ratio when it is stretched or compressed in the direction having an angle of about 45 degrees relative to the first direction.

8. A method for using a Poisson's ratio material, comprising:
   providing the Poisson's ratio material, wherein the Poisson's ratio material comprises:
   a first characteristic direction;
   a second characteristic direction that is substantially perpendicular to the first characteristic direction;
   a third characteristic direction having an angle of about 45 degrees in relation to the first characteristic direction;
   a plurality of first films formed from a plurality of first carbon nanotubes aligned in the first characteristic direction;
   a plurality of second films formed from a plurality of second carbon nanotubes aligned in the second characteristic direction;
   a polydimethylsiloxane matrix, wherein the pluralities of first films and second films are disposed in the polydimethylsiloxane matrix;
   wherein the plurality of first films and the plurality of second films are alternately arranged and stacked on one another and the plurality of first carbon nanotubes in the plurality of first films are substantially perpendicular to the carbon nanotubes in the second films; and
   stretching or compressing the poisson's ratio material in a direction having an angle of about 45 degrees relative to the first characteristic direction.

9. The method for using a Poisson's ratio material as claimed in claim 8, wherein the Poisson's ratio material shows a positive Poisson's ratio when it is stretched or compressed in the direction having an angle of about 45 degrees relative to the first characteristic direction.

\* \* \* \* \*